R. SKINNER & B. BONNET.

Assignors, by mesne assignments, to J. E. NUTTMAN & C. E. WHITIN, Trustee.

Concrete Pavement.

No. 7,996 Reissued Dec. 18, 1877.

Witnesses:
Philip F. Larner
A. B. Cauldwell

Inventors
Robert Skinner & Bonnet Bonnet
By Munn & Co
Attys

UNITED STATES PATENT OFFICE.

ROBERT SKINNER AND BONNET BONNET, OF SAN FRANCISCO, CALIFORNIA, ASSIGNORS, BY MESNE ASSIGNMENTS, TO JAMES E. NUTTMAN AND CHARLES E. WHITIN, TRUSTEE.

IMPROVEMENT IN CONCRETE PAVEMENTS.

Specification forming part of Letters Patent No. 105,502, dated July 19, 1870; Reissue No. 7,996, dated December 18, 1877; application filed November 26, 1877.

DIVISION A.

*To all whom it may concern:*

Be it known that we, ROBERT SKINNER and BONNET BONNET, of the city and county of San Francisco, in the State of California, have invented a certain new and useful Concrete Paving-Block; and the following specification, taken in connection with the drawings furnished and forming a part of the same, is a true, clear, and complete decription of said invention.

The said invention consists in a concrete paving-block the sides of which are vertically recessed, so that, when the blocks are placed side by side to form a pavement, these recesses may be filled with concrete in bulk, and thus secure a complete union of the blocks and a solid pavement.

To more particularly describe said invention, reference will be made to the drawings, in which—

Figure 1:
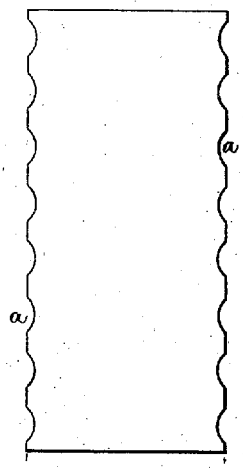
Figure 2:
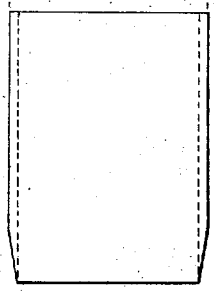
Figure 3:
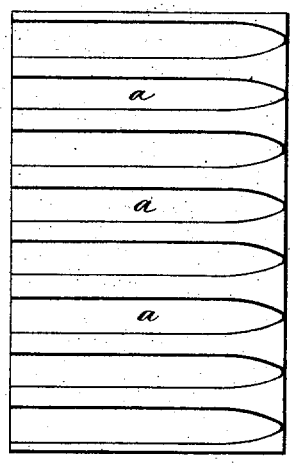

Figures 1, 2, and 3 represent, in bottom, end, and side view, one of said blocks.

The vertical recesses are shown at *a*, extending from the bottom to the top of the block. The sides of the block are also inclined, the top being narrower than the bottom, as is shown in Fig. 2.

When laid in a pavement the concrete between the blocks, and occupying the recesses, constitutes a series of vertical masses, which are united together by the mass of concrete which occupies the V-shaped recess, and the whole adheres with more or less tenacity to the blocks.

It will be seen that with the solid concrete in the recesses no longitudinal movement of any block can occur under the ordinary conditions of use, and also that neither end of a block can settle independently of the adjacent blocks without rupturing the vertical masses of solid concrete, which operate practically as keys.

The concrete blocks are formed in molds of the desired configuration, and compressed in hydraulic or other powerful presses.

What is claimed as the invention to be secured by these Letters Patent is—

A molded concrete paving-block provided with vertical recesses at the sides, substantially as described.

ROBERT SKINNER.
B. BONNET.

Witnesses:
S. M. THARP,
E. H. THARP.